(12) United States Patent
Lee et al.

(10) Patent No.: US 12,347,425 B2
(45) Date of Patent: Jul. 1, 2025

(54) ELECTRONIC DEVICE AND SPEECH PROCESSING METHOD THEREOF

(71) Applicant: SAMSUNG ELECTRONICS CO., LTD., Suwon-si (KR)

(72) Inventors: Gilho Lee, Suwon-si (KR); Sichen Jin, Suwon-si (KR); Sungsoo Kim, Suwon-si (KR); Jungin Lee, Suwon-si (KR); Seokyeong Jung, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 274 days.

(21) Appl. No.: 17/939,664

(22) Filed: Sep. 7, 2022

(65) Prior Publication Data

US 2023/0085539 A1    Mar. 16, 2023

Related U.S. Application Data

(63) Continuation of application No. PCT/KR2022/011196, filed on Jul. 29, 2022.

(30) Foreign Application Priority Data

Sep. 10, 2021    (KR) .................. 10-2021-0120796

(51) Int. Cl.
*G10L 15/197*    (2013.01)
*G10L 15/02*    (2006.01)
(Continued)

(52) U.S. Cl.
CPC ............ *G10L 15/197* (2013.01); *G10L 15/02* (2013.01); *G10L 15/22* (2013.01); *G10L 15/30* (2013.01);
(Continued)

(58) Field of Classification Search
CPC ... G10L 15/197; G10L 15/1822; G10L 15/02; G10L 15/22; G10L 15/30; G10L 15/08;
(Continued)

(56) References Cited

U.S. PATENT DOCUMENTS 8,131,548 B2    3/2012    Blass et al.
8,996,379 B2    3/2015    Cerra et al.
(Continued)

FOREIGN PATENT DOCUMENTS

JP    2007-041443    2/2007
JP    5164922    3/2013
(Continued)

OTHER PUBLICATIONS

Search Report dated Oct. 24, 2022 in counterpart International Patent Application No. PCT/KR2022/011196.

*Primary Examiner* — Yogeshkumar Patel
(74) *Attorney, Agent, or Firm* — Nixon & Vanderhye, P.C.

(57) ABSTRACT

According to various example embodiments, an electronic device includes a microphone configured to receive an audio signal including speech of a user, a processor, and a memory configured to store instructions executable by the processor and personal information of the user, in which the processor is configured to extract a plurality of speech recognition candidates by analyzing a feature of the speech of the user, extract a keyword based on the plurality of speech recognition candidates, search for replacement data, based on the keyword and the personal information, and generate a recognition result corresponding to the speech of the user, based on the replacement data.

20 Claims, 9 Drawing Sheets

(51) Int. Cl.
*G10L 15/08* (2006.01)
*G10L 15/22* (2006.01)
*G10L 15/30* (2013.01)

(52) U.S. Cl.
CPC .. *G10L 2015/081* (2013.01); *G10L 2015/088* (2013.01)

(58) Field of Classification Search
CPC ............... G10L 17/00; G10L 2015/081; G10L 2015/088
See application file for complete search history.

(56) References Cited

U.S. PATENT DOCUMENTS

| | | | |
|---|---|---|---|
| 9,190,055 | B1 | 11/2015 | Kiss et al. |
| 11,437,026 | B1* | 9/2022 | Roshan Ghias ........ G10L 15/22 |
| 2002/0173955 | A1* | 11/2002 | Reich ...................... G10L 15/22 |
| | | | 704/E15.04 |
| 2003/0182113 | A1* | 9/2003 | Huang .................... G10L 15/30 |
| | | | 704/E15.047 |
| 2005/0010412 | A1* | 1/2005 | Aronowitz .............. G10L 15/04 |
| | | | 704/E15.005 |
| 2014/0058729 | A1* | 2/2014 | Nagatomo .............. G10L 15/22 |
| | | | 704/235 |
| 2018/0330722 | A1* | 11/2018 | Newendorp ........ G10L 15/1815 |
| 2019/0238535 | A1* | 8/2019 | Lew ........................ G10L 17/04 |

FOREIGN PATENT DOCUMENTS

| | | |
|---|---|---|
| JP | 5621993 | 11/2014 |
| JP | 5956384 | 7/2016 |
| KR | 10-2011-0071197 | 6/2011 |
| KR | 10-2015-0024188 | 3/2015 |
| KR | 10-2016-0030168 | 3/2016 |
| KR | 10-2016-0066441 | 6/2016 |
| KR | 10-2017-0081883 | 7/2017 |
| KR | 10-2019-0110072 | 9/2019 |
| KR | 10-2041621 | 11/2019 |
| KR | 10-2135022 | 7/2020 |

* cited by examiner

ELECTRONIC DEVICE AND SPEECH PROCESSING METHOD THEREOF

CROSS-REFERENCE TO RELATED APPLICATIONS

This application is a continuation of International Application No. PCT/KR2022/011196 designating the United States, filed on Jul. 29, 2022, in the Korean Intellectual Property Receiving Office and claiming priority to Korean Patent Application No. 10-2021-0120796, filed on Sep. 10, 2021, in the Korean Intellectual Property Office, the disclosures of which are incorporated by reference herein in their entireties.

BACKGROUND

1. Field

The disclosure relates to an electronic device and a speech processing method of the electronic device.

2. Description of Related Art

Speech recognition performance of a terminal may generally be improved using terminal use information, such as contacts, installed apps, and/or position information. Speech recognition may not be performed only by the terminal. A speech recognition result and the terminal use information may be transmitted to a server and be used as data to improve the speech recognition performance.

However, the terminal use information may include information (e.g., contacts, schedules, etc.) that the user is unwilling to expose or through which a user may be identified. Such personal information may be transmitted to the server and unintentionally be stored in the server, thereby increasing the possibility of exposure or user identification.

To solve this issue, conventionally, a person has separately performed de-identification on data (e.g., removing information from which a person can be identified) in the server. However, the user of a speech recognition function may be unwilling to use the speech recognition function out of concerns that the person who performs the de-identification may discover personal information during the process and that the user's personal information may be exposed.

SUMMARY

Various example embodiments may reduce the possibility of personal information leakage and improve the performance of speech recognition using personal information in an electronic device internally without leaking or providing the personal information externally.

According to various example embodiments, an electronic device includes a microphone configured to receive an audio signal including speech of a user, a processor, and a memory configured to store instructions executable by the processor and personal information of the user, in which the processor is configured to extract a plurality of speech recognition candidates by analyzing a feature of the speech of the user, extract a keyword based on the plurality of speech recognition candidates, search for replacement data, based on the keyword and the personal information, and generate a recognition result corresponding to the speech of the user, based on the replacement data.

According to various example embodiments, an electronic device includes a microphone configured to receive an audio signal including speech of a user, a processor, and a memory configured to store instructions executable by the processor and personal information of the user, in which the processor is configured to extract a plurality of speech recognition candidates by analyzing a feature of the speech of the user, extract a keyword based on the plurality of speech recognition candidates, search for replacement data, based on the keyword and the personal information, generate a recognition result corresponding to the speech of the user, based on the replacement data, and perform security processing on the recognition result, based on the personal information.

According to various example embodiments, a speech processing method of an electronic device includes receiving an audio signal including speech of a user, extracting a plurality of speech recognition candidates by analyzing a feature of the speech of the user, extracting a keyword based on the plurality of speech recognition candidates, searching for replacement data, based on the keyword and the personal information of the user, and generating a recognition result corresponding to the speech of the user, based on the replacement data.

Various example embodiments may improve the performance of speech recognition using personal information of a user in an electronic device.

Various example embodiments may reduce the possibility of personal information leakage by performing security processing on personal information of a user.

In addition, various effects directly or indirectly ascertained through the present disclosure may be provided.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
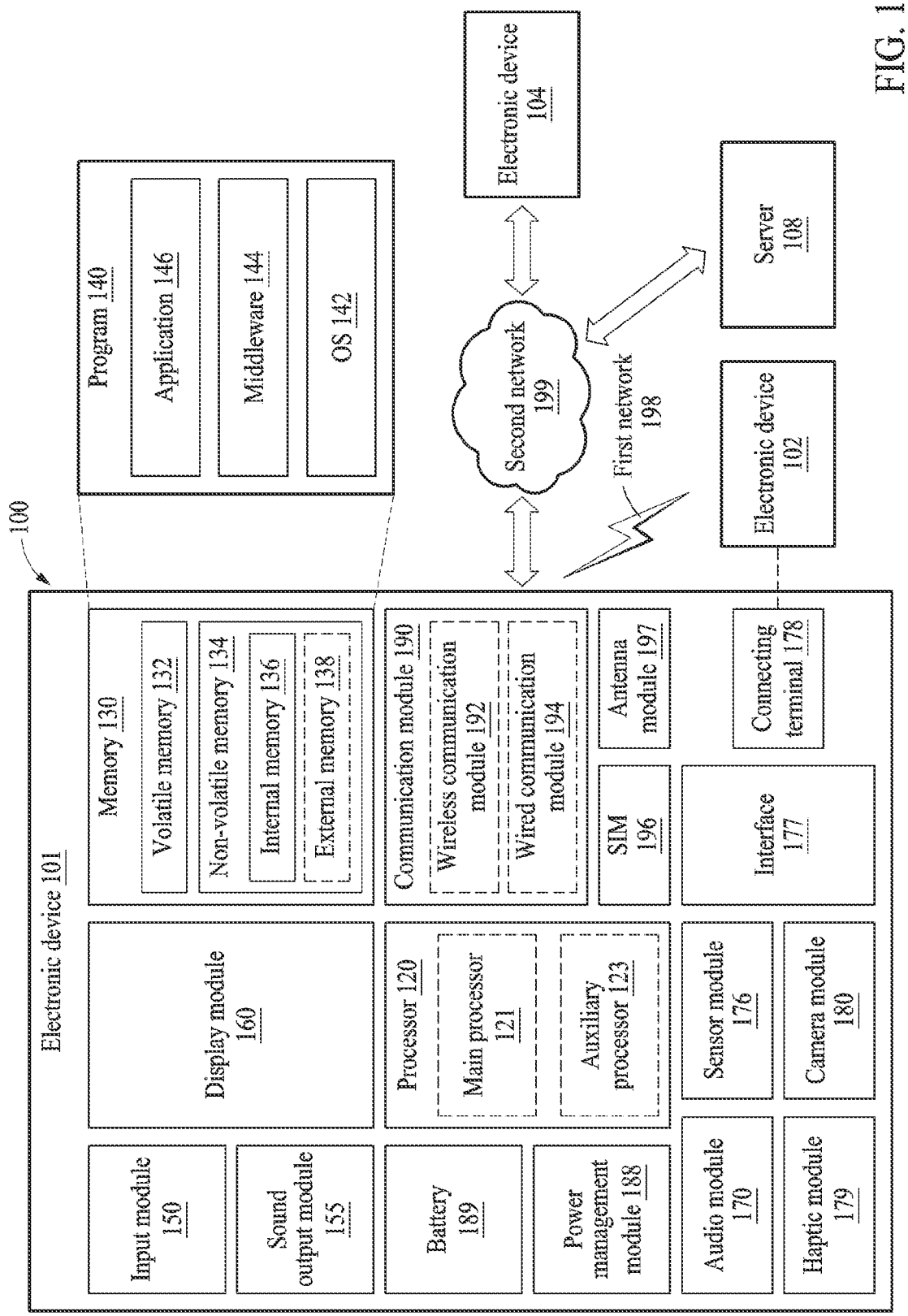
FIG. 1 is a block diagram illustrating an electronic device in a network environment according to various example embodiments.

Hereinafter, various example embodiments will be described in greater detail with reference to the accompanying drawings. When describing the example embodiments with reference to the accompanying drawings, like reference numerals refer to like elements and a repeated description related thereto will be omitted.

FIG. 1 is a block diagram illustrating an electronic device 101 in a network environment 100 according to various example embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include any one or any combination of a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, and an antenna module 197. In various example embodiments, at least one (e.g., the connecting terminal 178) of the above components may be omitted from the electronic device 101, or one or more other components may be added in the electronic device 101. In various example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120 and may perform various data processing or computation. According to an example embodiment, as at least a part of data processing or computation, the processor 120 may store a command or data received from another components (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101 (e.g., a user). The display module 160 may include, for example, a control circuit for controlling a display, a hologram device, or a projector and control circuitry to control a corresponding one of the display, the hologram device, and the projector.

According to an example embodiment, the display module 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., an electronic device 102 such as a speaker or a headphone) directly (e.g., by a wired connection) or wirelessly connected to the electronic device 101.

The sensor module 176 may detect an operational state (e.g., power or temperature) of the electronic device 101 or an environmental state (e.g., a state of a user) external to the electronic device 101 and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, image signal processors, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196. The subscriber identification module 196 may include a plurality of subscriber identification modules. For example, the plurality of subscriber identification modules may store different subscriber information.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include a slit antenna, and/or an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band. For example, the plurality of antennas may include a patch array antenna and/or a dipole array antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an example embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that various example embodiments of the present disclosure and the terms used therein are not intended to limit the technological features set forth herein to particular example embodiments and include various changes, equivalents, or replacements for a corresponding example embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A. B and C", and "A, B, or C," each of which may include any one of the items listed together in the corresponding one of the phrases, or all possible combinations thereof. Terms such as "first", "second", or "1st" or "2nd" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various example embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., an internal memory 136 or an external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the "non-transitory" storage medium may refer, for example, to a tangible device, and does not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 2:
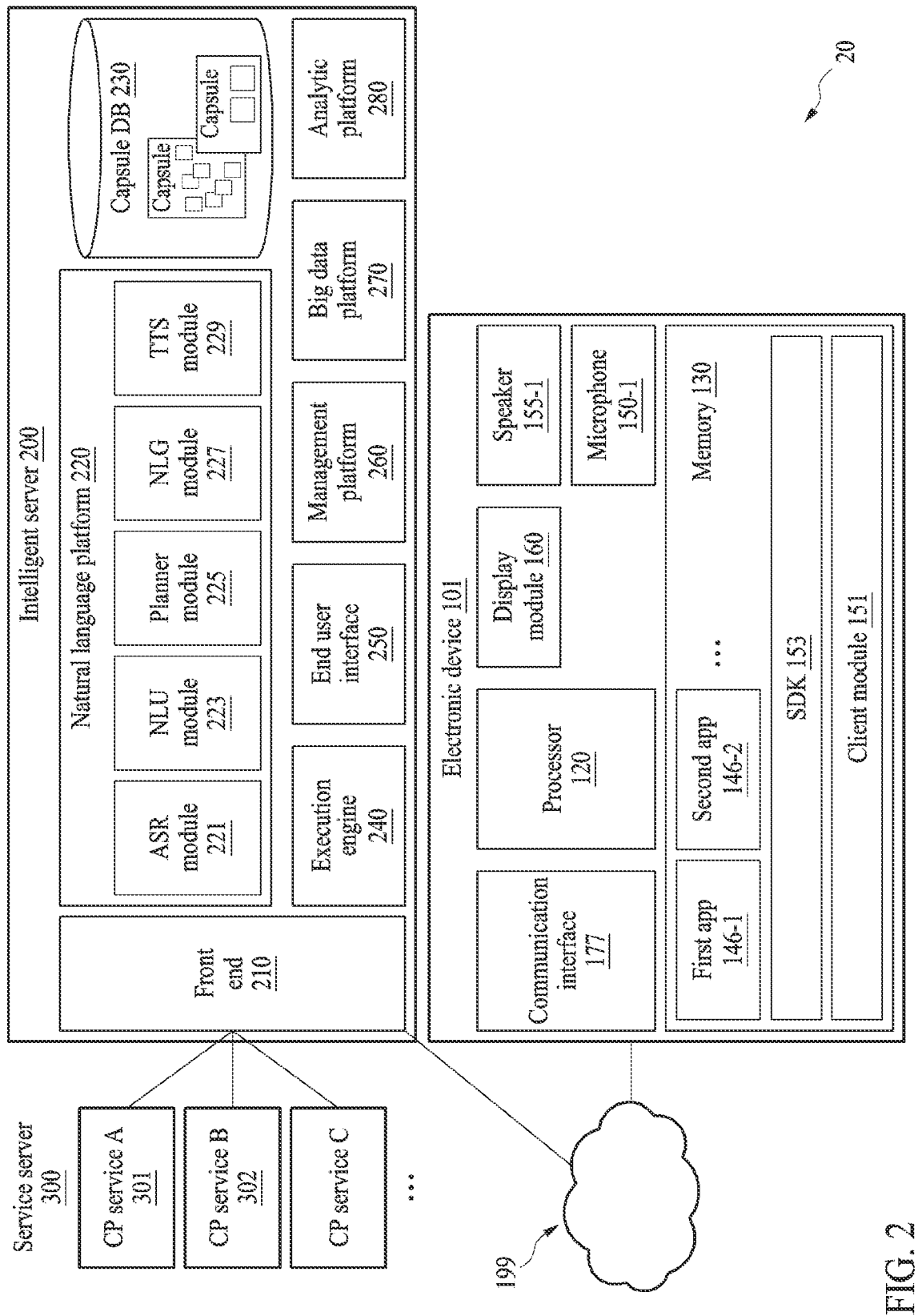
FIG. 2 is a block diagram illustrating an integrated intelligence system according to an example embodiment.

FIG. 2 is a block diagram illustrating an integrated intelligence system according to an example embodiment.

Referring to FIG. 2, an integrated intelligence system 20 according to an example embodiment may include an electronic device (e.g., the electronic device 101 of FIG. 1), an intelligent server 200 (e.g., the server 108 of FIG. 1), and a service server 300 (e.g., the server 108 of FIG. 1).

The electronic device 101 may be a terminal device (or an electronic device) connectable to the Internet and may be, for example, a mobile phone, a smartphone, a personal digital assistant (PDA), a notebook computer, a TV, a white home appliance, a wearable device, a head-mounted display (HMD), or a smart speaker.

According to an example embodiment, the electronic device 101 may include a communication interface 177 (e.g., the interface 177 of FIG. 1), a microphone 150-1 (e.g., the input module 150 of FIG. 1), a speaker 155-1 (e.g., the sound output module 155 of FIG. 1), a display module 160 (e.g., the display module 160 of FIG. 1), a memory 130 (e.g., the memory 130 of FIG. 1), or a processor 120 (e.g., the processor 120 of FIG. 1). The components listed above may be operationally or electrically connected to each other.

The communication interface 177 may be connected to an external device and configured to transmit and receive data to and from the external device. The microphone 150-1 may receive sound (e.g., a user utterance) and convert the sound into an electrical signal. The speaker 155-1 may output the electrical signal as sound (e.g., speech).

The display module 160 may be configured to display an image or video. The display module 160 may also display a graphical user interface (GUI) of an app (or an application program) being executed. The display module 160 may receive a touch input through a touch sensor. For example, the display module 160 may receive a text input through a touch sensor in an on-screen keyboard area displayed on the display module 160.

The memory 130 may store a client module 151, a software development kit (SDK) 153, and a plurality of apps 146 (e.g., the application 146 of FIG. 1). The client module 151 and the SDK 153 may configure a framework (or a solution program) for performing general-purpose functions. In addition, the client module 151 or the SDK 153 may configure a framework for processing a user input (e.g., a voice input, a text input, or a touch input).

The plurality of apps 146 stored in the memory 130 may be programs for performing designated functions. The plurality of apps 146 may include a first app 146-1, a second app 146-2, and the like. Each of the plurality of apps 146 may include a plurality of actions for performing a designated function. For example, the apps 146 may include an alarm app, a messaging app, and/or a scheduling app. The plurality of apps 146 may be executed by the processor 120 to sequentially execute at least some of the plurality of actions.

The processor 120 may control the overall operation of the electronic device 101. For example, the processor 120 may be electrically connected to the communication interface 177, the microphone 150-1, the speaker 155-1, and the display module 160 to perform a designated operation.

The processor 120 may also perform the designated function by executing a program stored in the memory 130. For example, the processor 120 may execute at least one of the client module 151 and the SDK 153 to perform the operation for processing a user input described below. The processor 120 may control the operation of the plurality of apps 146 through, for example, the SDK 153. The following operations, which is an operation of the client module 151 or the SDK 153, may be performed by the processor 120.

The client module 151 may receive a user input. For example, the client module 151 may receive a voice signal corresponding to a user utterance through the microphone 150-1. As another example, the client module 151 may receive a touch input through the display module 160. As still another example, the client module 151 may receive a text input through a keyboard or an on-screen keyboard. In addition, the client module 151 may receive various types of user inputs through an input module included in the electronic device 101 or an input module connected to the electronic device 101. The client module 151 may transmit the received user input to the intelligent server 200 over network 199. The client module 151 may transmit, to the intelligent server 200, state information of the electronic device 101 together with the received user input. The state information may be, for example, execution state information of an app.

The client module 151 may receive a result corresponding to the received user input. For example, when the intelligent server 200 calculates a result corresponding to the received user input, the client module 151 may receive the result corresponding to the received user input. The client module 151 may display the received result on the display module 160. Furthermore, the client module 151 may output the received result as audio through the speaker 155-1.

The client module 151 may receive a plan corresponding to the received user input. The client module 151 may display, on the display module 160, results of executing a plurality of actions of an app according to the plan. For example, the client module 151 may sequentially display, on the display module 160, the results of executing the plurality of actions and output the results as audio through the speaker 155-1. As another example, the electronic device 101 may display, on the display module 160, only a portion of the results of executing the plurality of actions (e.g., a result of the last action) and output the portion of the results as audio through the speaker 155-1.

According to an example embodiment, the client module 151 may receive, from the intelligent server 200, a request for obtaining information necessary for calculating a result corresponding to the user input. According to an example embodiment, the client module 151 may transmit the necessary information to the intelligent server 200, in response to the request.

The client module 151 may transmit, to the intelligent server 200, information on the results of executing the plurality of actions according to the plan. The intelligent server 200 may confirm that the received user input has been correctly processed using the information on the results.

The client module 151 may include a speech recognition module. According to an example embodiment, the client module 151 may recognize a voice input for performing a limited function through the speech recognition module. For example, the client module 151 may execute an intelligent app for processing a voice input to perform an organic operation through a designated input (e.g., Wake up!).

The intelligent server 200 may receive, from the electronic device 101 through a communication network, information related to a user voice input. According to an example embodiment, the intelligent server 200 may change data related to the received voice input into text data. According to an example embodiment, the intelligent server 200 may generate a plan for performing a task corresponding to the user voice input, based on the text data.

According to an example embodiment, the plan may be generated by an artificial intelligence (AI) system. The AI system may be a rule-based system or a neural network-based system (e.g., a feedforward neural network (FNN) or a recurrent neural network (RNN)). Alternatively, the AI system may be a combination thereof or other AI systems. According to an example embodiment, the plan may be selected from a set of predefined plans or may be generated in real time in response to a user request. For example, the AI system may select at least one plan from among the predefined plans.

The intelligent server 200 may transmit a result according to the generated plan to the electronic device 101 or transmit the generated plan to the electronic device 101. According to an example embodiment, the electronic device 101 may display, on the display, the result according to the plan. According to an example embodiment, the electronic device 101 may display, on the display, a result of executing an action according to the plan.

The intelligent server 200 may include a front end 210, a natural language platform 220, a capsule database (DB) 230, an execution engine 240, an end user interface 250, a management platform 260, a big data platform 270, or an analytic platform 280.

The front end 210 may receive the user input from the electronic device 101. The front end 210 may transmit a response corresponding to the user input.

According to an example embodiment, the natural language platform 220 may include an automatic speech recognition (ASR) module 221, a natural language understanding (NLU) module 223, a planner module 225, a natural language generator (NLG) module 227, or a text-to-speech (TTS) module 229.

The ASR module 221 may convert the voice input received from the electronic device 101 into text data. The NLU module 223 may discern an intent of a user using the text data of the voice input. For example, the NLU module 223 may discern the intent of the user by performing syntactic analysis or semantic analysis on a user input in the form of text data. The NLU module 223 may discern the meaning of a word extracted from the user input using a linguistic feature (e.g., a grammatical element) of a morpheme or phrase and determine the intent of the user by matching the discerned meaning of the word to an intent.

The planner module 225 may generate a plan using a parameter and the intent determined by the NLU module 223. According to an example embodiment, the planner module 225 may determine a plurality of domains required to perform a task, based on the determined intent. The planner module 225 may determine a plurality of actions included in each of the plurality of domains determined based on the intent. According to an example embodiment, the planner module 225 may determine a parameter required to execute the determined plurality of actions or a result value output by the execution of the plurality of actions. The parameter and the result value may be defined as a concept of a designated form (or class). Accordingly, the plan may include a plurality of actions and a plurality of concepts determined by the intent of the user. The planner module 225 may determine a relationship between the plurality of actions and the plurality of concepts stepwise (or hierarchically). For example, the planner module 225 may determine an execution order of the plurality of actions determined based on the intent of the user, based on the plurality of concepts. In other words, the planner module 225 may determine the execution order of the plurality of actions, based on the parameter required for the execution of the plurality of actions and results output by the execution of the plurality of actions. Accordingly, the planner module 225 may generate a plan including connection information (e.g., ontology) between the plurality of actions and the plurality of concepts. The planner module 225 may generate the plan using information stored in the capsule DB 230 that stores a set of relationships between concepts and actions.

The NLG module 227 may change designated information into a text form. The information changed to the text form may be in the form of a natural language utterance. The TTS module 229 may change information in a text form into information in a speech form.

According to an example embodiment, some or all of the functions of the natural language platform 220 may be implemented in the electronic device 101 as well.

The capsule DB 230 may store information on the relationship between the plurality of concepts and actions respectively corresponding to a plurality of domains. A capsule according to an example embodiment may include a plurality of action objects (or action information) and concept objects (or concept information) included in the plan. According to an example embodiment, the capsule DB 230 may store a plurality of capsules in the form of a concept action network (CAN). According to an example embodiment, the plurality of capsules may be stored in a function registry included in the capsule DB 230.

The capsule DB 230 may include a strategy registry that stores strategy information necessary for determining a plan corresponding to a voice input. The strategy information may include reference information for determining one plan when there are a plurality of plans corresponding to the user input. According to an example embodiment, the capsule DB 230 may include a follow-up registry that stores information on follow-up actions for suggesting a follow-up action to the user in a designated situation. The follow-up action may include, for example, a follow-up utterance. According to an example embodiment, the capsule DB 230 may include a layout registry that stores layout information that is information output through the electronic device 101. According to an example embodiment, the capsule DB 230 may include a vocabulary registry that stores vocabulary information included in capsule information. According to an example embodiment, the capsule DB 230 may include a dialog registry that stores information on a dialog (or an interaction) with the user. The capsule DB 230 may update stored objects through a developer tool. The developer tool may include, for example, a function editor for updating an action object or a concept object. The developer tool may include a vocabulary editor for updating a vocabulary. The developer tool may include a strategy editor for generating and registering a strategy for determining a plan. The developer tool may include a dialog editor for generating a dialog with the user. The developer tool may include a follow-up editor for activating a follow-up objective and editing a follow-up utterance that provides a hint. The follow-up objective may be determined based on a current set objective, a preference of the user, or an environmental condition. In an example embodiment, the capsule DB 230 may be implemented in the electronic device 101 as well.

The execution engine 240 may calculate or obtain a result using the generated plan. The end user interface 250 may transmit the calculated result to the electronic device 101. Accordingly, the electronic device 101 may receive the result and provide the received result to the user. The management platform 260 may manage information used by the intelligent server 200. The big data platform 270 may collect data of the user. The analytic platform 280 may manage a quality of service (QoS) of the intelligent server 200. For example, the analytic platform 280 may manage the components and processing rate (or efficiency) of the intelligent server 200.

The service server 300 may provide a designated service (e.g., food order or hotel reservation) to the electronic device 101. According to an example embodiment, the service server 300 may be a server operated by a third party. The service server 300 may provide, to the intelligent server 200, information to be used for generating a plan corresponding to the received user input. The provided information may be stored in the capsule DB 230. In addition, the service server 300 may provide, to the intelligent server 200, result information according to the plan.

In the integrated intelligence system 20 described above, the electronic device 101 may provide various intelligent services to the user, in response to a user input. The user input may include, for example, an input through a physical button, a touch input, or a voice input.

In an example embodiment, the electronic device 101 may provide a speech recognition service through an intelligent app (or a speech recognition app) stored in the electronic device 101. In this case, for example, the electronic device 101 may recognize a user utterance or a voice input received through the microphone and provide, to the user, a service corresponding to the recognized voice input.

In an example embodiment, the electronic device 101 may perform a designated action alone or together with an intelligent server and/or a service server, based on the received voice input. For example, the electronic device 101 may execute an app corresponding to the received voice input and perform a designated action through the executed app.

In an example embodiment, when the electronic device 101 provides a service together with the intelligent server 200 and/or the service server 300, the electronic device 101 may detect a user utterance using the microphone 150-1 and generate a signal (or voice data) corresponding to the detected user utterance. The electronic device 101 may transmit speech data to the intelligent server 200 using the communication interface 177.

The intelligent server 200 may generate, as a response to the voice input received from the electronic device 101, a plan for performing a task corresponding to the voice input or a result of performing an action according to the plan. The plan may include, for example, a plurality of actions for performing a task corresponding to a voice input of a user, and a plurality of concepts related to the plurality of actions. The concepts may define parameters input to the execution of the plurality of actions or result values output by the execution of the plurality of actions. The plan may include connection information between the plurality of actions and the plurality of concepts.

The electronic device 101 may receive the response using the communication interface 177. The electronic device 101 may output a voice signal internally generated by the electronic device 101 to the outside using the speaker 155-1 or output an image internally generated by the electronic device 101 to the outside using the display module 160.

Figure 3:
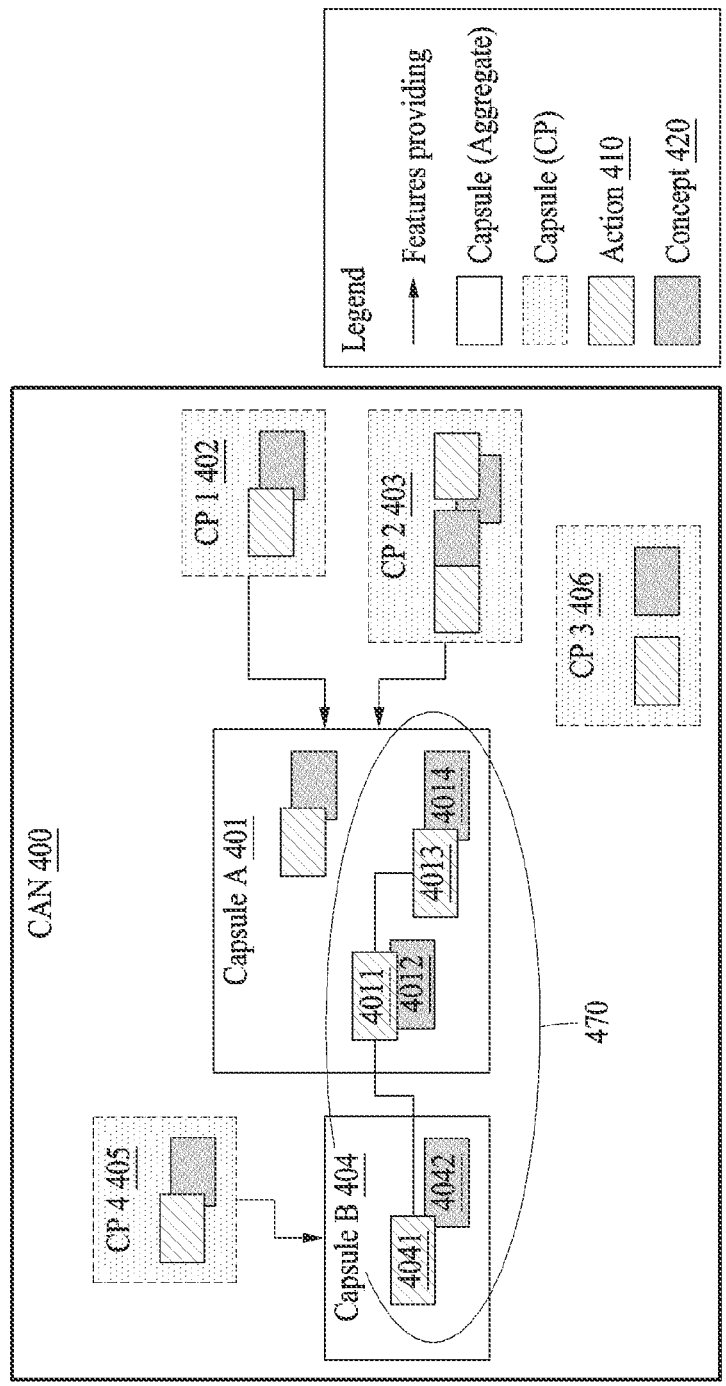
FIG. 3 is a diagram illustrating a form in which relationship information between concepts and actions is stored in a database according to various example embodiments.

FIG. 3 is a diagram illustrating a form in which relationship information between concepts and actions is stored in a database according to various example embodiments.

A capsule DB (e.g., the capsule DB 230) of the intelligent server 200 may store capsules in the form of a CAN 400. The capsule DB may store an action for processing a task corresponding to a voice input of a user and a parameter necessary for the action in the form of a CAN.

The capsule DB may store a plurality of capsules (a capsule A 401 and a capsule B 404) respectively corresponding to a plurality of domains (e.g., applications). According to an example embodiment, one capsule (e.g., the capsule A 401) may correspond to one domain (e.g., a location (geo) or an application). Furthermore, the one capsule may correspond to at least one service provider (e.g., CP 1 402 or CP 2 403) for performing a function for a domain related to the one capsule. According to an example embodiment, one capsule may include at least one action 410 for performing a designated function and at least one concept 420.

The natural language platform 220 may generate a plan for performing a task corresponding to a received voice input using the capsules stored in the capsule DB. For example, the planner module 225 of the natural language platform 220 may generate the plan using the capsules stored in the capsule DB. For example, a plan 470 may be generated using actions 4011 and 4013 and concepts 4012 and 4014 of the capsule A 401 and an action 4041 and a concept 4042 of the capsule B 404.

Figure 4:
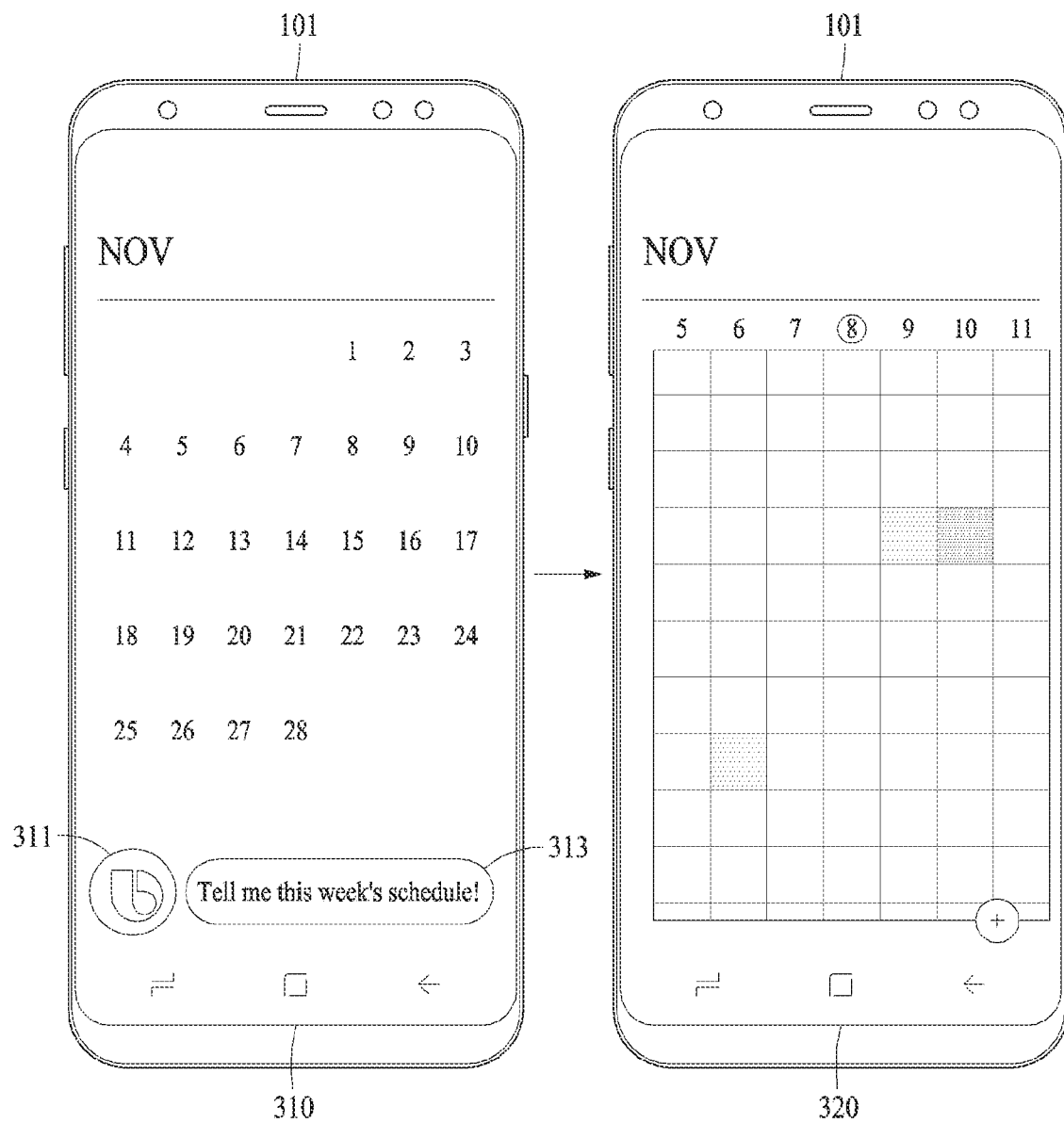
FIG. 4 is a diagram illustrating a screen of an electronic device processing a received voice input through an intelligent app according to various example embodiments.

FIG. 4 is a diagram illustrating a screen of an electronic device processing a received voice input through an intelligent app according to various example embodiments.

An electronic device (e.g., the electronic device 101 of FIG. 1) may execute an intelligent app to process a user input through an intelligent server (e.g., the intelligent server 200 of FIG. 2).

According to an example embodiment, on a screen 310, when a designated voice input (e.g., Wake up!) is recognized or an input through a hardware key (e.g., a dedicated hardware key) is received, the electronic device 101 may execute an intelligent app for processing the voice input. The electronic device 101 may execute the intelligent app, for example, in a state in which a scheduling app is being executed. According to an example embodiment, the electronic device 101 may display an object 311 (e.g., an icon) corresponding to the intelligent app on the display module 160. According to an example embodiment, the electronic device 101 may receive a voice input by a user utterance. For example, the electronic device 101 may receive a voice input of "Tell me this week's schedule!". According to an example embodiment, the electronic device 101 may display a user interface (UI) 313 (e.g., an input window) of the intelligent app in which text data of the received voice input is displayed on the UI 313.

According to an example embodiment, on a screen 320, the electronic device 101 may display a result corresponding to the received voice input on the display. For example, the electronic device 101 may receive a plan corresponding to the received user input and display "the schedule this week" on the display according to the plan.

Figure 5:
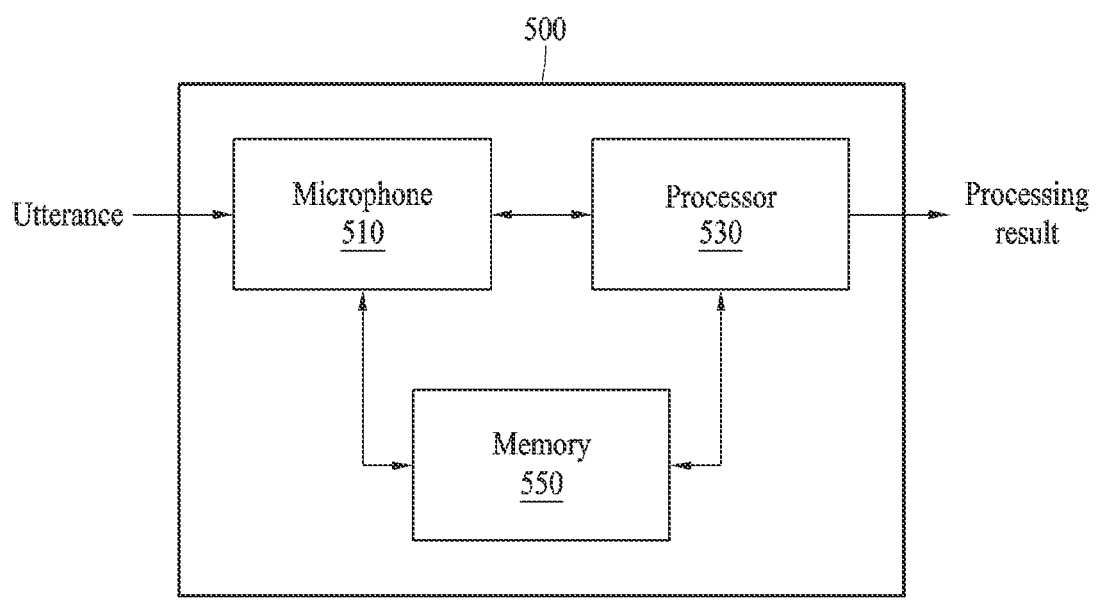
FIG. 5 is a block diagram illustrating an electronic device according to various example embodiments.

FIG. 5 is a block diagram illustrating an electronic device according to various example embodiments.

Referring to FIG. 5, according to various example embodiments, an electronic device 500 (e.g., the electronic device 101 of FIG. 1) may process speech of a user. The electronic device 500 may generate a processing result by processing the speech of the user and may provide the generated processing result to the user.

According to various example embodiments, the electronic device 500 may improve the performance of voice recognition using the user's personal information included in the electronic device 500 for a speech recognition operation of the electronic device 500. The electronic device 500 may prevent personal information leakage by performing security processing such that the personal information of the user is not leaked to an external server (e.g., the server 108 of FIG. 1).

According to various example embodiments, the electronic device 500 may include a microphone 510 (e.g., the microphone 150-1 of FIG. 2), a processor 530 (e.g., the processor 120 of FIG. 1), and/or a memory 550 (e.g., the memory 130 of FIG. 1). The microphone 510 may receive an audio signal including speech (utterance) of the user. The microphone 510 may output the received audio signal to the processor 530.

According to various example embodiments, the processor 530 may process data stored in the memory 550. The processor 530 may execute computer-readable code (for example, software) stored in the memory 550 and instructions triggered by the processor 530. The processor 530 may be data processing hardware having a circuit that is physically structured to execute desired operations. For example, the desired operations may include code or instructions included in a program.

According to various example embodiments, the hardware-implemented data processing device may include a microprocessor, a CPU, a processor core, a multi-core processor, a multiprocessor, ASIC, and/or a field-programmable gate array (FPGA).

According to various example embodiments, the processor 530 may extract a plurality of speech recognition candidates by analyzing a feature of speech. The processor 530 may extract a feature vector based on the speech and extract the plurality of speech recognition candidates based on the feature vector.

According to various example embodiments, the processor 530 may calculate probability values respectively corresponding to the plurality of speech recognition candidates, based on the feature vector. The probability values may include a first probability value and a second probability value.

According to various example embodiments, the processor 530 may calculate the first probability value by inputting the plurality of speech recognition candidates to a first language model that models a general feature of a language. The processor 530 may calculate the second probability value by inputting the plurality of speech recognition candidates to a second language model that models a linguistic feature of the user.

According to various example embodiments, the processor 530 may determine one or more target candidates based on the probability values. The processor 530 may determine one or more target candidates based on the first probability value and the second probability value.

The processor 530 may extract a keyword based on a speech recognition candidate. The processor 530 may extract a keyword, based on a plurality of speech recognition candidates and a database related to speech of the user.

According to various example embodiments, the database related to speech of the user may include a feature of utterance of the user, a feature of vocalization of the user, a feature of pronunciation of the user, a sentence structure included in the speech of the user, and/or grammar of a sentence included in the speech of the user.

According to various example embodiments, the processor 530 may search for replacement data, based on the keyword and the personal information. The processor 530 may detect an entity's name (hereinafter, referred to as entity name) from a recognition result, based on the database related to speech of the user. The processor 530 may obtain a category corresponding to the entity name, based on a preset rule.

According to various example embodiments, the processor 530 may search for the replacement data based on the category. The entity name may include a person's name (hereinafter, referred to as a person name) included in the speech of the user, a name of an application related to the speech of the user, and a name of content included in the speech of the user. Content may include an image, video, music, or text. The category may include a schedule included in the speech of the user and/or an action related to the speech of the user. For example, the action related to the speech of the user may include calling, texting, executing, ending, searching, and/or sending.

According to various example embodiments, the processor 530 may generate the recognition result corresponding to the voice of the user, based on the replacement data. The processor 530 may search for similar data to the category from the personal information. The processor 530 may calculate a similarity between the similarity data and the entity name. The processor 530 may determine the similar data to be the replacement data, based on the similarity.

According to various example embodiments, the processor 530 may determine whether a schedule of the user and a position of the user are included in the recognition result, based on the personal information. The processor 530 may perform security processing by performing masking or deletion on the recognition result, based on a determination result.

According to various example embodiments, the memory 550 may store instructions executable by the processor 530. The memory 550 may store the personal information of the user in the electronic device 500. The memory 550 may store instructions (or programs) executable by the processor 530. For example, the instructions may include instructions for performing an operation of the processor 530 and/or an operation of each component of the processor 530.

According to various example embodiments, the memory 550 may be implemented as a volatile memory device or a non-volatile memory device. The volatile memory device may be implemented as dynamic random access memory (DRAM), static random access memory (SRAM), thyristor RAM (T-RAM), zero capacitor RAM (Z-RAM), or twin transistor RAM (TTRAM).

The non-volatile memory device may be implemented as electrically erasable programmable read-only memory (EEPROM), flash memory, magnetic RAM (MRAM), spin-transfer torque (STT)-MRAM, conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, a molecular electronic memory device, and/or insulator resistance change memory.

Figure 6:
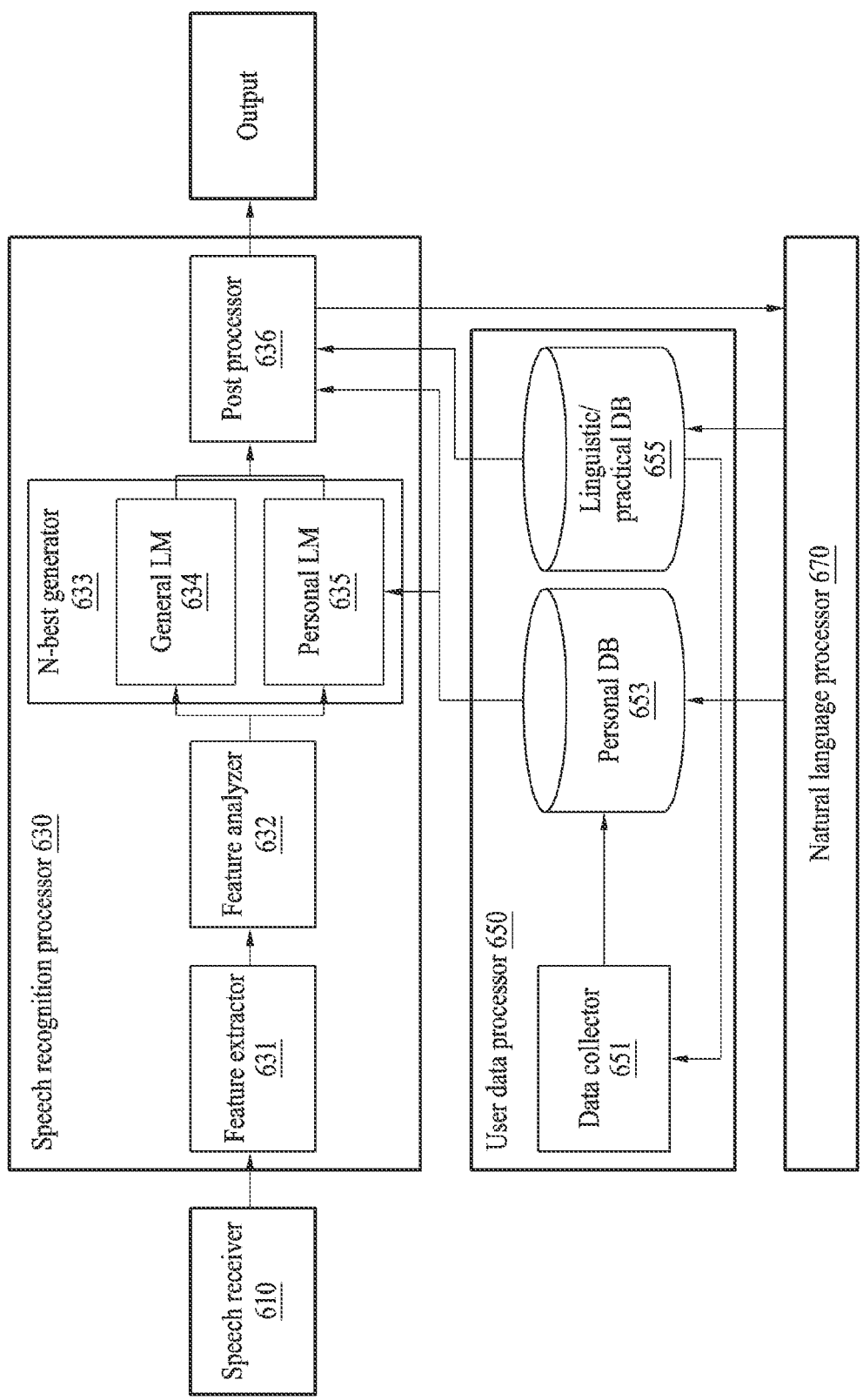
FIG. 6 is an example of a configuration of an electronic device according to various example embodiments.

FIG. 6 is an example of a configuration of an electronic device according to various example embodiments.

Referring to FIG. 6, the electronic device (e.g., the electronic device 500 of FIG. 5) may include a speech receiver 610, a speech recognition processor 630, and/or a user data processor 650. The electronic device 500 may perform speech processing using a server (e.g., the server 108 of FIG. 1). The server may be physically separated from the electronic device 500. The speech receiver 610 may include a microphone (e.g., the microphone 150-1 of FIG. 2).

According to various example embodiments, the speech recognition processor 630, the user data processor 650, and the natural language processor 670 may be included in a processor (e.g., the processor 530 of FIG. 5). The speech recognition processor 630 may include a feature extractor 631, a feature analyzer 632, an N-best generator 633, and a post processor 636. The N-best generator 633 may extract a speech recognition candidate using a general language model (LM) 634 and a personal language model (LM) 635.

According to various example embodiments, the user data processor 650 may include a data collector 651, a personal database (DB) 653, and a linguistic/practical database (DB) 655. The natural language processor 670 may be implemented in the server 108. According to various example embodiments, the speech receiver 610 may output, to the speech recognition processor 630, an utterance received through the microphone 510 of the electronic device 500. The speech receiver 610 may input an utterance transmitted from a device connected to the electronic device 500 to an audio buffer, perform post-processing on the utterance, and output the utterance to the speech recognition processor 630.

According to various example embodiments, the speech recognition processor 630 may recognize speech and convert the speech into text. The feature extractor 631 may extract a feature vector for speech recognition from the received speech. The feature analyzer 632 may analyze the extracted feature vector and infer a plurality of speech recognition candidates.

According to various example embodiments, the N-best generator 633 may determine a target candidate among the plurality of speech recognition candidates inferred by the feature analyzer 632, based on probability values respectively corresponding to the plurality of speech recognition candidates. The N-best generator 633 may select N candidate groups in an order of high probability. N may be a natural number. The N-best generator 633 may select N candidate groups as target candidates using the general language model 634 and the personal language model 635.

According to various example embodiments, the general language model 634 may model a general feature of a language, apply the modelled general feature to a speech recognition candidate, analyze a relationship between a word order and/or a speech recognition unit, and calculate probability (e.g., a first probability value) corresponding to the speech recognition candidate. The personal language model 635 refers to a model that models use information in the electronic device 500 and may be applied to a speech recognition candidate and used to calculate a similarity between the speech recognition candidate and personal information. The N-best generator 633 may calculate a second probability value using the personal language model 635.

According to various example embodiments, the post processor 636 may perform post-processing on N target candidates selected based on the probability values respectively corresponding to the plurality of speech recognition candidates. The post processor 636 may perform post-processing on target candidates using the user data processor 650. The post processor 636 may determine and correct an error of the target candidates using the personal database 653 and the linguistic/practical database 655.

According to various example embodiments, the post processor 636 may compare a keyword of a person's name (hereinafter, referred to as a person name keyword), which may be in the use information in the electronic device 500, with data in a category of a person's name (hereinafter, referred to as a person name category) in the personal database 653. When data "Cutie" is in the person name category, the intent of a user utterance may be determined to be "Cutie". In this case, the post processor 636 may output a final speech recognition result as "Where was I supposed to have dinner with Cutie tomorrow?". The post processor 636 may compare the recognition result with the data. The post processor 636 may measure a similarity between the recognition result and a pronunciation sequence of the data, and when the similarity falls in a predetermined error range (e.g., an allowable error range), the recognition result may be replaced with replacement data. The post processor 636, when the replaced data corresponds to personal information, may perform security processing before a part corresponding to personal information is transmitted to the server. For example, the post processor 636 may perform security processing, through masking or deletion, on personal information.

According to various example embodiments, the user data processor 650, by collecting and processing use information of the user in the electronic device 500, may generate data necessary for improving speech recognition performance and data necessary for post-processing a speech recognition result.

According to various example embodiments, the data collector 651 may extract a keyword from the speech recognition result by analyzing a sentence structure of the speech recognition result and a feature of the user utterance using the linguistic/practical database 655. For example, when the speech receiver 610 receives speech of, "Where was I supposed to have dinner with Cutie tomorrow?", the data collector 651 may extract "Cutie (a person name)" and "Where (a place, a question)" as keywords.

According to various example embodiments, the data collector 651 may collect the use information in the electronic device 500, such as a directory, an installed app, and/or a schedule. The data collector 651 may set a category, such as a person name-name category and a person name-nickname category and collect names and nicknames in the directory under the set category. The data collector 651 may set a category, such as an app-name category and an app-developer category, and collect application installation information, such as an application name and an application developer under the set category. The data collector 651 may set a category, such as a schedule-name category, a schedule-place category, and a schedule-time category, and collect schedule information under the set category. The data collector 651 may store collected data in the personal database 653. The data collector 651 may generate additional information using information stored in the personal database 653 and may process and generate secondary data using the additional information. For example, the data collector 651 may extract a keyword from content that the user inputs using an input device while using an application or may extract and store a keyword from a screen that the user is watching. The data collector 651 may extract and store a keyword using the linguistic/practical database 655.

According to various example embodiments, the personal database 653 may store, by category, information generated from a user profile and the data collector 651. The personal database 653 may separately designate and manage a personally identifiable category. Data stored in the personal database 653 may be used to generate the personal language model 635 or may be used for post-processing by the post processor 636.

According to various example embodiments, the linguistic/practical database 655 may store data representing the features of speech, utterance, and pronunciation of the user. The data stored in the linguistic/practical database 655 may be used in the data collector 651 and for post-processing by the post processor 636. The data stored in the linguistic/practical database 655 may include a sentence structure, grammar, and/or a speech feature for extracting keywords. For example, the data stored in the linguistic/practical database 655 may be stored in a form of "[call/text] (from/to) <name>" and/or "[execute/end/delete] <app>". The data stored in the linguistic/practical database 655 may be applied to a recognition result. The data collector 651 may recognize and extract <name> and/or <application> as a keyword by applying data stored in the linguistic/practical database 655 to a sentence, which is an input to secondary data processing. The data stored in the linguistic/practical database 655 may be accumulated as the user uses a speech recognition device (e.g., the electronic device 500). The data stored in the linguistic/practical database 655 may be learned and developed through the natural language processor 670.

According to various example embodiments, the natural language processor 670 may learn data for de-identifying a speech recognition result and correcting the speech recognition result. However, when there is an operation or memory restriction in the electronic device 500 in implementing a natural language processing function, the natural language processor 670 may be implemented in the server 108. The natural language processor 670 may analyze a personal linguistic feature, such as a feature of pronunciation of the user and/or an utterance pattern, through the speech recognition result and transmit the analyzed personal linguistic feature to the linguistic/practical database 655. Information transmitted to the linguistic/practical database 655 may be used by the post processor 636. For example, the natural language processor 670 may structure a personalized word order depending on a user and/or a difference in a regional accent.

According to various example embodiments, an output may have a form for providing a user with a final recognition result. The output may be transmitted to another unit that uses the speech recognition result.

Figure 7:
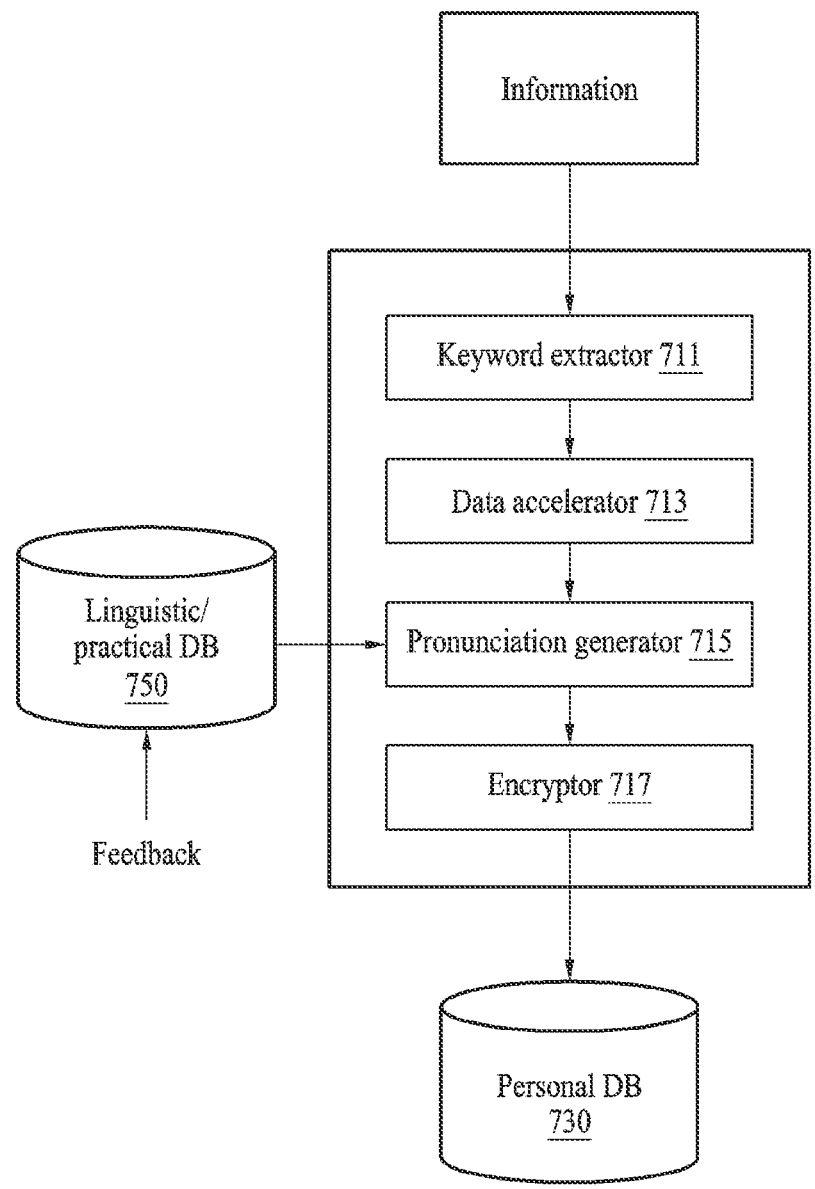
FIG. 7 is a flowchart illustrating an operation of a user data processor according to various example embodiments.

FIG. 7 is a flowchart illustrating an operation of a user data processor according to various example embodiments.

Referring to FIG. 7, according to various example embodiments, the user data processor (e.g., the user data processor 650 of FIG. 6) may include a keyword extractor 711, a data accelerator 713, a pronunciation generator 715, and/or encryptor 717.

According to various example embodiments, the keyword extractor 711 may extract a keyword from information in an electronic device (e.g., the electronic device 500 of FIG. 5). The keyword extractor 711 may include information on contacts, information on applications, information on playlists, and/or information on displays (e.g., the display module 160 of FIG. 1). The contacts may include a name, a nickname, a phone number, and/or an e-mail, and the information on applications may include an application name and/or a category. The information on playlists may include a song title, a singer name, and/or a genre, and the information on displays may include a keyword of a currently displayed application, a keyword of currently displayed text, and/or a keyword of a currently displayed image.

According to various example embodiments, the data accelerator 713 may generate possible combinations using extracted keywords. The data accelerator 713 may distinguish between similar names using the possible combinations. For example, the data accelerator 713 may store (a singer, a song title), (a production company, an application name), and (a school name, a person name) each as a pair.

The pronunciation generator 715 may generate pronunciation (or a pronunciation sequence) for the possible combinations generated by the data accelerator 713 using a linguistic rule and a rule representing a personal feature of a user of the electronic device 500. The linguistic rule may be used instead of the rule representing a personal feature during an initial operation. The pronunciation generator 715 may adaptively operate to generate a personalized rule as the user uses the electronic device 500. The pronunciation generator 715 may generate a pronunciation sequence through speech recognition when receiving a user utterance. The pronunciation generator 715 may receive feedback through a re-utterance of the user. The pronunciation generator 715 may receive feedback through a linguistic/practical database 750 (e.g., the linguistic/practical database 655 of FIG. 6). The pronunciation generator 715 may measure a similarity of personalized rule with the linguistic rule, based on the feedback, generate a personalized pronunciation rule, and reflect the generated personalized pronunciation rule in a new rule. The pronunciation generator 715 may generate a processible amount of pronunciation (or a pronunciation sequence) in the electronic device 500 and secure the diversity of pronunciation.

The encryptor 717 may encrypt data generated by the keyword extractor 711, the data accelerator 713, and the pronunciation generator 715 and prevent a personal information leakage. The encryptor 717 may store the encrypted data in a personal database 730 (e.g., the personal database 653 of FIG. 6).

Figure 8:
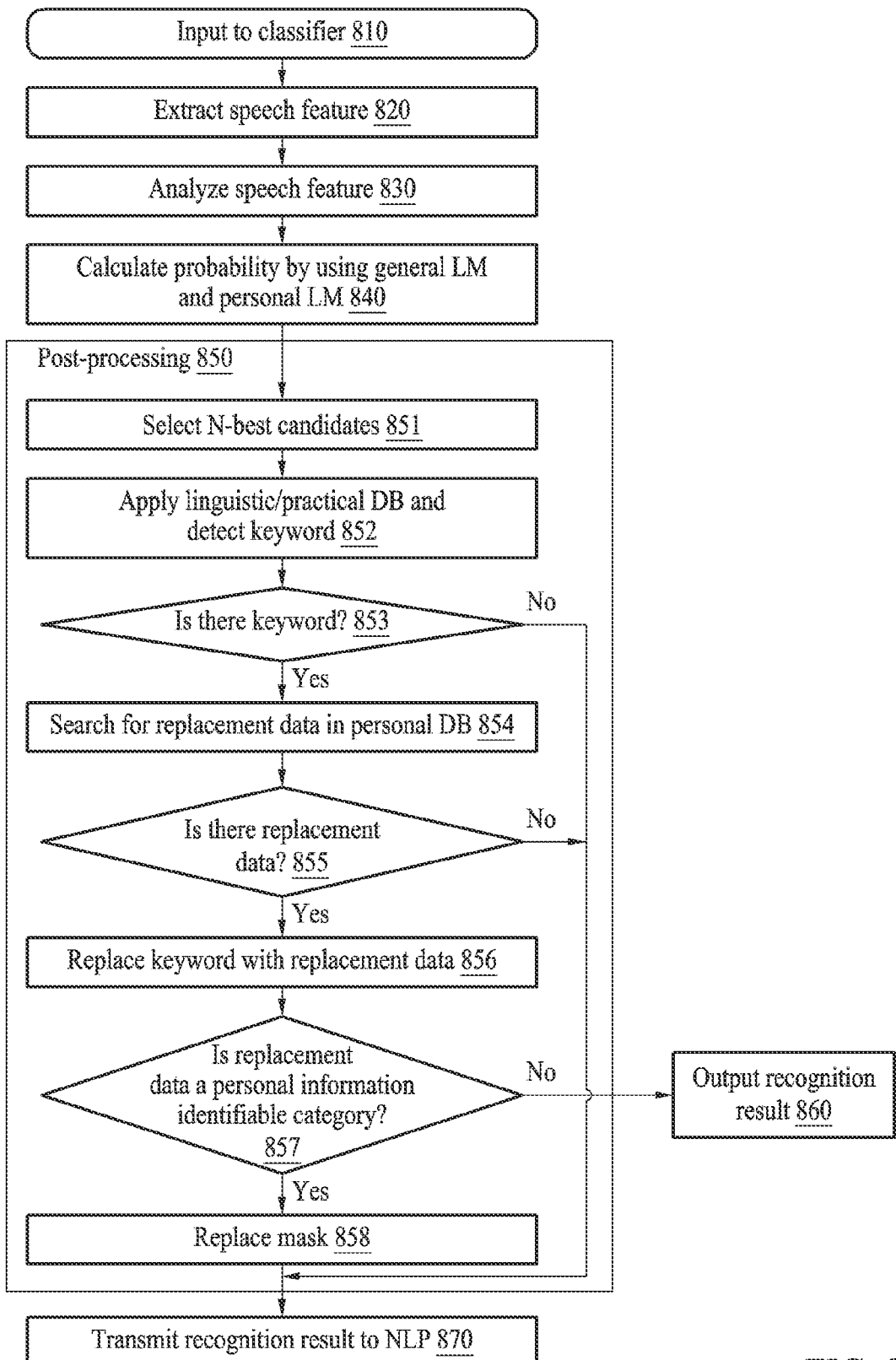
FIG. 8 is a flowchart illustrating a speech recognition operation of an electronic device according to various example embodiments.

FIG. 8 is a flowchart illustrating a speech recognition operation of an electronic device according to various example embodiments.

Referring to FIG. 8, according to various example embodiments, in operation 810, user speech received through a speech receiver (e.g., the speech receiver 610 of FIG. 6) may be input to a classifier. In operation 820, a feature extractor (e.g., the feature extractor 631 of FIG. 6) may extract a feature vector from the user speech. In operation 830, a feature analyzer (e.g., the feature analyzer 632 of FIG. 6) may analyze the extracted feature vector and infer a plurality of speech recognition candidates.

In operation 840, an N-best generator (e.g., the N-best generator 633 of FIG. 6) may calculate probability values (e.g., a hit probability) by simultaneously applying a general language model (e.g., the general language model 634 of FIG. 6) and a personal language model (e.g., the personal language model 635 of FIG. 6) to the plurality of speech recognition candidates. The probability values may include a first probability value and a second probability value.

In operation 850, a post processor (e.g., the post processor 636 of FIG. 6) may perform post-processing on target candidates. In operation 851, the post processor 636 may select the target candidates by selecting N-best candidates. The post processor 636 may select, as the target candidates, N candidates different from each other that have high probability values among the plurality of speech recognition candidates, based on the calculated probability values. For example, when N is 4, a target candidate 1 may be "Store the meeting with Cutie at 9 at Seocho-gu Office", a target candidate 2 may be "Store the meeting with Cute at 9 at Seocho-gu Office", a target candidate 3 may be "Store the meeting with Kutie at 9 at Seocho-gu Office", and a target candidate 4 may be "Store the meeting with Kute at 9 at Seocho-gu Office".

In operation 852, the post processor 636 may detect a keyword using a linguistic/practical database (e.g., the linguistic/practical database 655). The post processor 636 may determine and/or correct a recognition error using the linguistic/practical database 655 for a recognition result (e.g., a target candidate). In operation 853, the post processor 636 may determine whether the recognition result has a keyword. The linguistic/practical database 655 may include a feature of a user utterance and/or speech and may be used to detect an entity name, such as a person name, an application, a song title, and/or a singer, from the recognition result. If the recognition result does not have a keyword (no in operation 853), the post processor 636 may transmit the recognition result to a natural language processor (the natural language processor 670) in operation 870.

The post processor 636 may infer a category through context tracking, based on the detected entity name. The post processor 636 may infer the category based on a predetermined rule. The linguistic/practical database 655 may store rules.

According to various example embodiments, a rule may have a form of "schedule" [command], "call/text" [command], and/or "execute/end/search/transmit" [command]. A sub-rule of a "schedule" category may have the following forms:
1. "appointment/meeting/ . . . "<with>[person name] <from/to>[time][place];
2. "appointment/meeting/ . . . "<with>[person name] [time]<from/to>[place]:
3. "appointment/meeting/ . . . "<from/to>[time][place] <with>[person name]; and
4. "appointment/meeting/ . . . " [time]<from/to>[place] <with>[person name].

According to various example embodiments, a sub-rule of a "call/text" category may have the following forms:
1. "call/text" (to <speaker/speaker phone>)<to/at/for/toward>[name/phone number], and
2. "call/text"<to/at/for/toward>[name/phone number] (to <speaker/speaker phone>).

According to various example embodiments, a sub-rule of a "execute/end/search/transmit" category may have the following forms:
1. "execute/end" [app name](developed by/from [app developer]), and
2. "search/transmit" [function]<in/to>[app name].

According to various example embodiments, " " may refer to a determination reference word, ( ) may refer to an omittable word, [ ] may refer to a detection target, / may refer to or, and < > may refer to an adjunct (e.g., a postposition).

According to various example embodiments, the determination reference word, the adjunct, and/or the rule may be generated based on general grammar and/or a speech method. When each user has a personalized speech method, the natural language processor 670 may continuously add, modify, or delete rule by detecting the personalized speech method, generating a rule, or modifying an existing rule.

According to various example embodiments, the post processor 636, by storing an utterance history and analyzing a current utterance together with a previous utterance, may estimate a category and apply the above-mentioned rule. The content detected by the N-best generator 633 using the above-described rule may be a "schedule" category, (person name) "Cutie", "Cute", "Kutie", and "Kute".

When a keyword is identified (yes in operation 853), the post processor 636, may search for replacement data in a personal database (e.g., the personal database 653 of FIG. 6) in operation 854. In operation 855, the post processor 636 may determine whether there is replacement data. When there is replacement data (yes in operation 855), the post processor 636 may replace the keyword with the replacement data in operation 856. When there is no replacement data (no in operation 855), the post processor 636 may transmit a recognition result to the natural language processor 670.

According to various example embodiments, the post processor 636 may calculate a similarity of detected data with similar data of the personal database 653, which is the same as an inferred category. The post processor 636 may calculate the similarity by calculating an edit distance. The post processor 636, when the calculated edit distance falls within a threshold, may replace a detected entity name with the similar data. The post processor 636 may calculate edit distances for the four person names detected by the N-best generator 633 and names in a (person name) category in the personal database 653. For example, when there is "Kudie" among names stored in the electronic device 500, edit distances may be calculated as 2 for Cutie, 4 for Cute, 1 for Kutie, and 3 for Kute. The post processor 636 may select "Kutie" that has the shortest edit distance, replace "Kutie" with the stored name "Kudie", and determine as a final result that "Store the meeting with Kudie at 9 at Seocho-gu Office in the schedule".

According to various example embodiments, an allowable error is described to be 1 in the foregoing example, but the allowable error may vary depending on the length of text and/or a similarity of uttered phonemes. When the allowable error is 0.5, there is no recognition result that falls in an error range. Therefore, Cutie, a first candidate having a highest speech recognition probability value among the N-best candidates, may be selected.

In operation 857, the post processor 636 may determine whether the replacement data is an identifiable category of personal information (hereinafter, referred to as a personal information identifiable category). When the replacement data is a personal information identifiable category (yes in operation 857), the post processor 636 may perform mask replacement on personal information in operation 858. When the replacement data is not a personal information identifiable category (no in operation 857), the post processor 636 may output a recognition result in operation 860. In operation 870, the post processor 636 may transmit the recognition result, on which mask replacement has been performed, to the natural language processor 670.

According to various example embodiments, the post processor 636 may provide a final recognition result to a user, and if necessary, transmit the final recognition result to other units in the electronic device 500. The final recognition result may be transmitted to a remote server (e.g., the server 108 of FIG. 1) for tracking of utterance context and/or utterance analysis, and personal identification information may be de-identified for personal information protection.

Whether a category is a personal information identifiable category may be determined based on a category of replaced data. For example, the post processor 636 may perform mask replacement on a person or schedule, for example, "Store the meeting with <person>***</person> at 9 at Seocho-gu Office in the schedule".

According to various example embodiments, the natural language processor 670 may determine whether the transmitted recognition result includes unintentionally exposed personal information and perform additional de-identification on personal information or delete the transmitted information. The natural language processor 670 may detect personal information based on a structure and/or content of a transmitted sentence. For example, the natural language processor 670 may delete "schedule" information from "Store the meeting with <person>*</person> at 9 at Seocho-gu Office in the schedule". The natural language processor 670 may delete information, such as a phone number, a resident registration number, and/or an address from "Change the phone number of <person>*</person> to 010-1234-5678". In other words, the natural language processor 670 may determine whether to detect information, such as a phone number, a resident registration number, and/or an address, in a sentence and de-identify such information.

According to various example embodiments, because a sentence structure is a speech feature of a user, the sentence structure may be used as a learning material to improve the performance of the natural language processor 670. The natural language processor 670 may delete a position and/or a path of a user from "I am at Suwon station now. I'll be there soon." The natural language processor 670 may determine whether to delete the position and/or the path of the user based on a place name in a sentence and/or words, such as "be there".

According to various example embodiments, the natural language processor 670 may detect personal information based on context. The natural language processor 670 may detect personal information, based on time, a place, a person name, a phone number, and/or a nickname. For example, the natural language processor 670 may detect time from "Let me know the schedule this Friday." and detect a place from "Find a restaurant closest to the appointment place." The natural language processor 670 may detect a person name from "Reflect the dinner appointment with Cutie at 7 there in the schedule.", detect a phone number from "Text 'Does 8780 get annoyed when he finds out about this?' to 010-1234-5678.", and detect that "he" is "8780 (nickname)" from "I really hate him." The natural language processor 670, when there is a person name ("Cutie") that is not stored in contacts in the electronic device 500, or when text (e.g., "8780") through which an individual is identified, may detect personal information inferred through utterances transmitted before and after.

The natural language processor 670 may analyze an utterance pattern of a user, perform additional de-identification by generating a rule, and output a de-identification result.

The natural language processor 670 may update the personal database 653 and the linguistic/practical database 655 using the received information. Text received from the server 108 is primarily de-identified in the electronic device 500. When information, such as an application, remains unmasked, the natural language processor 670 may determine that the unmasked information is not stored in the personal database 653 in the electronic device 500 and add information, such as inferred person name and application, to the personal database 653.

The natural language processor 670, when analyzing a sentence structure, and when the sentence structure is different from the sentence structure stored in the linguistic/practical database 655, may update the linguistic/practical database 655 by generating a new rule.

Figure 9:
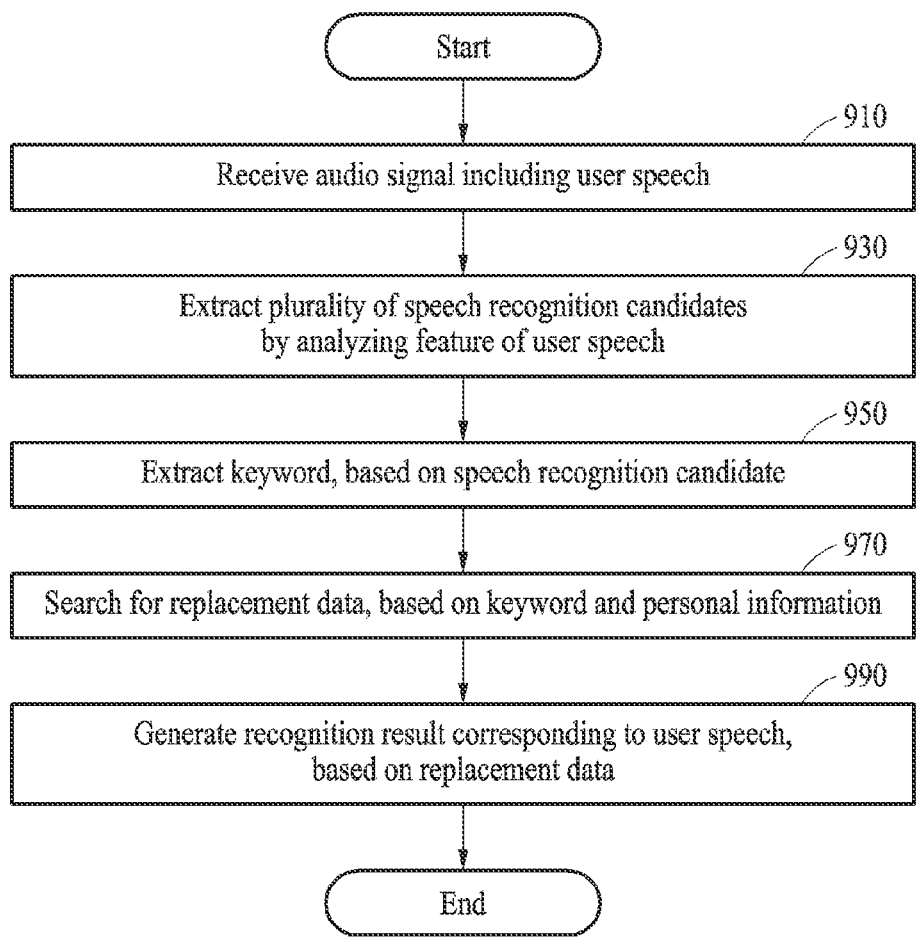
FIG. 9 is a flowchart illustrating an operation of an electronic device according to various example embodiments.

FIG. 9 is a flowchart illustrating an operation of an electronic device according to various example embodiments.

Referring to FIG. 9, in operation 910, a microphone (e.g., the microphone 510 of FIG. 5) may receive an audio signal including speech of a user. In operation 930, a processor (e.g., the processor 530 of FIG. 5) may extract a plurality of speech recognition candidates by analyzing the feature of the speech. The processor 530 may extract a feature vector based on the speech and extract a plurality of speech recognition candidates based on the feature vector.

According to various example embodiments, the processor 530 may calculate probability values respectively corresponding to the plurality of speech recognition candidates, based on the feature vector. The probability values may include a first probability value and a second probability value.

According to various example embodiments, the processor 530 may calculate the first probability value by inputting the plurality of speech recognition candidates to a first language model that models a general feature of a language. The processor 530 may calculate the second probability value by inputting the plurality of speech recognition candidates to a second language model that models a linguistic feature of the user.

According to various example embodiments, the processor 530 may determine one or more target candidates based on the probability values. The processor 530 may determine one or more target candidates, based on the first probability value and the second probability value.

In operation 950, the processor 530 may extract a keyword based on a speech recognition candidate. The processor 530 may extract a keyword, based on the plurality of speech recognition candidates and a database related to the speech of the user.

According to various example embodiments, the database related to the speech of the user may include a feature of utterance of the user, a feature of vocalization of the user, a feature of pronunciation of the user, a sentence structure included in the speech of the user, and/or grammar of a sentence included in the speech of the user.

In operation 970, the processor 530 may search for replacement data, based on a keyword and personal information. The processor 530 may detect an entity name from a recognition result, based on the database related to the speech of the user. The processor 530 may obtain a category corresponding to the entity name, based on a preset rule.

According to various example embodiments, the processor 530 may search for the replacement data based on the category. The entity name may include a person name included in the speech of the user, a name of an application related to the speech of the user, and a name of content included in the speech of the user. Content may include images, video, music, and/or text. The category may include a schedule included in the speech of the user and/or an action related to the speech of the user. For example, the action related to the speech of the user may include calling, texting, executing, ending, searching, and/or sending.

In operation 990, the processor 530 may generate the recognition result corresponding to the voice of the user, based on the replacement data. The processor 530 may search for similar data to the category from the personal information. The processor 530 may calculate a similarity between similarity data and the entity name. The processor 530 may determine the similar data to be the replacement data, based on the similarity.

According to various example embodiments, the processor 530 may determine whether a schedule of the user and a position of the user are included in the recognition result, based on the personal information. The processor 530 may perform security processing by performing masking or deletion on the recognition result, based on a determination result.

The memory 550 may store the personal information of the user in the electronic device 500.

According to various example embodiments, an electronic device (e.g., the electronic device 101 of FIG. 1) may include a microphone (e.g., the microphone 150-1 of FIG. 2) configured to receive an audio signal including speech of a user, a processor, and a memory configured to store instructions executable by the processor and personal information of the user, in which the processor is configured to extract a plurality of speech recognition candidates by analyzing a feature of the speech of the user, extract a keyword based on the plurality of speech recognition candidates, search for replacement data, based on the keyword and the personal information, and generate a recognition result corresponding to the speech of the user, based on the replacement data.

The processor may extract a feature vector based on the speech and extract the plurality of speech recognition candidates based on the feature vector.

The processor may calculate probability values respectively corresponding to the plurality of speech recognition candidates, based on the feature vector, and determine one or more target candidates based on the probability values.

The processor may calculate a first probability value by inputting the plurality of speech recognition candidates to a first language model that models a general feature of a language, calculate a second probability value by inputting the plurality of speech recognition candidates to a second language model that models a linguistic feature of the user, and determine the one or more target candidates, based on the first and second probability values.

The processor may extract the keyword, based on the plurality of speech recognition candidates and a database related to the speech of the user.

The database related to the speech of the user may include a feature of utterance of the user, a feature of vocalization of the user, a feature of pronunciation of the user, a sentence structure included in the speech of the user, and grammar of a sentence included in the speech of the user.

The processor may detect an entity name from the recognition result based on the database related to the speech of the user, obtain a category corresponding to the entity name based on a preset rule, and search for the replacement data based on the category.

The entity name may include a person name included in the speech of the user, a name of an application related to the voice of the user, and a name of content related to the voice of the user, and the category may include a schedule included in the voice of the user and an operation related to the voice of the user.

The processor may search for similar data to the category from the personal information, calculate a similarity between the similar data and the entity name, and determine the similar data to be the replacement data, based on the similarity.

According to various example embodiments, an electronic device includes a microphone configured to receive an audio signal including speech of a user, a processor, and a memory configured to store instructions executable by the processor and personal information of the user, in which the processor is configured to extract a plurality of speech recognition candidates by analyzing a feature of the speech of the user, extract a keyword based on the plurality of speech recognition candidates, search for replacement data, based on the keyword and the personal information, generate a recognition result corresponding to the speech of the user, based on the replacement data, and perform security processing on the recognition result, based on the personal information.

The processor may extract a feature vector based on the speech and extract the plurality of speech recognition candidates based on the feature vector.

The processor may calculate probability values respectively corresponding to the plurality of speech recognition candidates, based on the feature vector, and determine one or more target candidates based on the probability values.

The processor may calculate a first probability value by inputting the plurality of speech recognition candidates to a first language model that models a general feature of a language, calculate a second probability value by inputting the plurality of speech recognition candidates to a second language model that models a linguistic feature of the user, and determine the one or more target candidates, based on the first and second probability values.

The processor may extract the keyword, based on the plurality of speech recognition candidates and a database related to the speech of the user.

The database related to the speech of the user may include a feature of utterance of the user, a feature of vocalization of the user, a feature of pronunciation of the user, a sentence structure included in the speech of the user, and grammar of a sentence included in the speech of the user.

The processor may detect an entity name from the recognition result, based on the database related to the speech of the user, obtain a category corresponding to the entity name based on a preset rule, and search for the replacement data based on the category.

The entity name may include a person name included in the speech of the user, a name of an application related to the voice of the user, and a name of content related to the voice of the user, and the category may include a schedule included in the voice of the user and an operation related to the voice of the user.

The processor may search for similar data to the category from the personal information, calculate a similarity between the similar data and the entity name, and determine the similar data to be the replacement data, based on the similarity.

The processor may determine whether a schedule of the user and a position of the user are included in the recognition result, based on the personal information, and based on the determination result, perform security processing by performing masking or deletion on the recognition result.

According to various example embodiments, a speech processing method of an electronic device includes receiving an audio signal including speech of a user, extracting a plurality of speech recognition candidates by analyzing a feature of the speech of the user, extracting a keyword based on the plurality of speech recognition candidates, searching for replacement data, based on the keyword and the personal information of the user, and generating a recognition result corresponding to the speech of the user, based on the replacement data.

What is claimed is:

1. An electronic device comprising:
a microphone configured to receive an audio signal including speech of a user,
a processor, and
a memory configured to store instructions executable by the processor and personal information of the user,
wherein the processor is configured to:
extract a plurality of speech recognition candidates by analyzing a feature of the speech of the user,
extract a keyword based on the plurality of speech recognition candidates,
search for replacement data to replace the keyword, based on the keyword and the personal information,
generate a recognition result corresponding to the speech of the user, based on the replacement data, and
perform security processing on the recognition result, based on the personal information.

2. The electronic device of claim 1, wherein the processor is configured to:
extract a feature vector based on the speech of the user, and
extract the plurality of speech recognition candidates based on the feature vector.

3. The electronic device of claim 2, wherein the processor is configured to:
calculate probability values respectively corresponding to the plurality of speech recognition candidates, based on the feature vector, and
determine one or more target candidates based on the probability values.

4. The electronic device of claim 1, wherein the processor is configured to:
calculate a first probability value by inputting the plurality of speech recognition candidates to a first language model, which models a general feature of a language,
calculate a second probability value by inputting the plurality of speech recognition candidates to a second language model, which models a linguistic feature of the user, and
determine one or more target candidates, based on the first probability value and the second probability value.

5. The electronic device of claim 1, wherein the processor is configured to extract the keyword, based on a database related to the plurality of speech recognition candidates and to the speech of the user.

6. The electronic device of claim 5, wherein the database related to the speech of the user comprises a feature of utterance of the user, a feature of vocalization of the user, a feature of pronunciation of the user, a sentence structure included in the speech of the user, or grammar of a sentence included in the speech of the user.

7. The electronic device of claim 5, wherein the processor is configured to:
detect an entity name from the recognition result, based on the database related to the speech of the user,
obtain a category corresponding to the entity name, based on a preset rule, and search for the replacement data based on the category.

8. The electronic device of claim 7, wherein the entity name comprises:
a person name included in the speech of the user, a name of an application related to the speech of the user, or a name of content included in the speech of the user, and
the category comprises:
a schedule included in the speech of the user or an operation related to the speech of the user.

9. The electronic device of claim 7, wherein the processor is configured to:
search for similar data to the category from the personal information,
calculate a similarity between the similar data and the entity name, and
determine the similar data to be the replacement data, based on the similarity.

10. An electronic device comprising:
a microphone configured to receive an audio signal including speech of a user;
a processor; and
a memory configured to store instructions executable by the processor and personal information of the user,
wherein the processor is configured to:
extract a plurality of speech recognition candidates by analyzing a feature of the speech of the user,
extract a keyword based on the plurality of speech recognition candidates,
search for replacement data to replace the keyword, based on the keyword and the personal information,
generate a recognition result corresponding to the speech of the user, based on the replacement data, and
perform security processing on the recognition result, based on the personal information.

11. The electronic device of claim 10, wherein the processor is configured to:
extract a feature vector based on the speech of the user, and
extract the plurality of speech recognition candidates based on the feature vector.

12. The electronic device of claim 11, wherein the processor is configured to:
calculate probability values respectively corresponding to the plurality of speech recognition candidates, based on the feature vector, and
determine one or more target candidates based on the probability values.

13. The electronic device of claim 10, wherein the processor is configured to:
calculate a first probability value by inputting the plurality of speech recognition candidates to a first language model, which models a general feature of a language,
calculate a second probability value by inputting the plurality of speech recognition candidates to a second language model, which models a linguistic feature of the user, and
determine one or more target candidates, based on the first probability value and the second probability value.

14. The electronic device of claim 10, wherein the processor is configured to extract the keyword, based on a database related to the plurality of speech recognition candidates and to the speech of the user.

15. The electronic device of claim 14, wherein
the database related to the speech of the user comprises a feature of utterance of the user, a feature of vocalization of the user, a feature of pronunciation of the user, a sentence structure included in the speech of the user, or grammar of a sentence included in the speech of the user.

16. The electronic device of claim 15, wherein
the processor is configured to:
- detect an entity name from the recognition result, based on the database related to the speech of the user,
- obtain a category corresponding to the entity name, based on a preset rule, and
- search for the replacement data based on the category.

17. The electronic device of claim 16, wherein
the entity name comprises:
- a person name included in the speech of the user, a name of an application related to the speech of the user, or a name of content included in the speech of the user, and the category comprises:
- a schedule included in the speech of the user or an operation related to the speech of the user.

18. The electronic device of claim 16, wherein
the processor is configured to:
- search for similar data to the category from the personal information,
- calculate a similarity between the similar data and the entity name, and
- determine the similar data to be the replacement data, based on the similarity.

19. The electronic device of claim 10, wherein
the processor is configured to:
- determine whether a schedule of the user and a position of the user are included in the recognition result, based on the personal information, and
- perform security processing by performing masking or deletion on the recognition result, based on a determination result.

20. A speech processing method of an electronic device, the method comprising:
- receiving an audio signal including speech of a user using a microphone,
- extracting a plurality of speech recognition candidates by analyzing a feature of the speech of the user,
- extracting a keyword based on the plurality of speech recognition candidates;
- searching for replacement data to replace the keyword, based on the keyword and personal information of the user,
- generating a recognition result corresponding to the speech of the user, based on the replacement data, and
- performing security processing on the recognition result, based on the personal information.

* * * * *